United States Patent [19]

Balliello

[11] Patent Number: 4,525,170
[45] Date of Patent: Jun. 25, 1985

[54] SOLID FORMULATIONS OF METAL COMPLEX DYES

[75] Inventor: Paolo Balliello, Rheinfelden, Fed. Rep. of Germany

[73] Assignee: Ciba-Geigy Corporation, Ardsley, N.Y.

[21] Appl. No.: 496,036

[22] Filed: May 19, 1983

[30] Foreign Application Priority Data

May 27, 1982 [DE] Fed. Rep. of Germany ....... 3220042

[51] Int. Cl.$^3$ .......................... C09B 67/24; D06P 3/02
[52] U.S. Cl. ............................................ 8/524; 8/526; 8/610; 8/685; 8/917; 8/924; 8/904
[58] Field of Search ........................... 8/524, 610, 685

[56] References Cited

U.S. PATENT DOCUMENTS

| | | | |
|---|---|---|---|
| 3,960,486 | 6/1976 | Daubach et al. | 8/524 |
| 4,058,480 | 11/1977 | Lohmann et al. | 8/524 |
| 4,233,026 | 11/1980 | Hitschfel et al. | 8/524 |
| 4,295,851 | 10/1981 | Neumann et al. | 8/524 |
| 4,300,900 | 11/1981 | Putzar et al. | 8/524 |
| 4,314,815 | 2/1982 | Mollet | 8/524 |

FOREIGN PATENT DOCUMENTS 24655 3/1981 European Pat. Off. .
88727 9/1983 European Pat. Off. .

OTHER PUBLICATIONS

Nemoto, Y. and Funahashi, H., Ind. Eng. Chem. Prod. Res. Dev., 1980, 19, pp. 136–142.

Primary Examiner—A. Lionel Clingman
Attorney, Agent, or Firm—Edward McC. Roberts; Kevin T. Mansfield

[57] ABSTRACT

The invention relates to solid formulations of metal complex dyes, which formulations are obtained by dissolving or suspending at least one metal complex dye in water with the addition of an anionic dispersant or mixture of dispersants, and 1 to 20% by weight, based on the final formulation, of a non-ionic ethylene oxide adduct having a molecular weight of 200 to 5000, and optionally further ingredients, subsequently mixing the components and spray drying the solution or suspension.

Such formulations are readily wettable and have a cold water dispersibility of $\geq 30$ g/l.

9 Claims, No Drawings

SOLID FORMULATIONS OF METAL COMPLEX DYES

The present invention relates to solid formulations of metal complex dyes and to the use thereof for dyeing or printing textile material.

Solid formulations of metal complex dyes are already known. They contain e.g. the dye, a (usually anionic) dispersant, as well as other ingredients such as extenders, wetting agents ar dust fixing agents. However, these formulations often have defects such as insufficient cold water solubility, poor dispersibility and/or wettability in cold water.

It is the object of the present invention to provide solid dyestuff formulations which do not have the defects referred to above.

Surprisingly, it has now been found that this object is accomplished with formulations of metal complex dyes which, in addition to containing an anionic dispersant or mixture of dispersants, also contain a non-ionic ethylene oxide adduct, and which furthermore are obtained by means of a specific drying method, viz. spray drying.

Accordingly, the invention relates to solid formulations of metal complex dyes, which formulations are obtained by dissolving or suspending at least one metal complex dye in water with the addition of an anionic dispersant or mixture of dispersants, and 1 to 20% by weight, based on the final formulation, of a non-ionic ethylene oxide adduct having a molecular weight of 200 to 5000, and optionally further ingredients, subsequently mixing the components and spray drying the solution or suspension.

Compared with known formulations of metal complex dyes which do not contain an ethylene oxide adduct and are not prepared by spray drying, the formulations of this invention have better wettability and, in particular, substantially better dispersibility and/or solubility in cold water. The ethylene oxide adducts, however, do not improve only the cold water dispersibility and/or solubility of metal complex dyes, but additionally act as dust inhibitors and thus facilitate the preparation and use of the formulations of this invention.

Preferred non-ionic ethylene oxide adducts are those selected from the class of reaction products of ethylene oxide with (a) saturated and/or unsaturated fatty alcohols containing 6 to 20 carbon atoms; or
(b) alkyl phenols containing 4 to 12 carbon atoms in the alkyl moiety; or
(c) saturated and/or unsaturated fatty amines containing 14 to 20 carbon atoms; or
(d) saturated and/or unsaturated fatty acids containing 14 to 20 carbon atoms.

Individual ethylene oxide adducts are:

(a) reaction products of saturated and/or unsaturated fatty alcohols containing 6 to 20 carbon atoms with 5 to 30 moles of ethylene oxide per mole of hydroxyl group;
(b) reaction products of alkylphenols containing 4 to 12 carbon atoms with 5 to 20 moles, preferably 8 to 15 moles, of ethylene oxide per mole of phenolic hydroxyl group;
(c) reaction products of saturated and/or unsaturated fatty amines containing 14 to 20 carbon atoms with 5 to 20 moles of ethylene oxide per mole of amino group;
(d) reaction products of saturated and/or unsaturated fatty acids containing 14 to 20 carbon atoms with 5 to 20 moles of ethylene oxide per mole of carboxyl group.

Of these ethylene oxide adducts, the reaction products specified in (b) are preferred.

Mixtures of the ethylene oxide adducts of (a), (b), (c) and (d) with one another may also be used. These mixtures are obtained by mixing individual reaction products, or direct by ethoxylating a mixture of the compounds on which the adducts are based.

Suitable saturated and/or unsaturated fatty alcohols for (a) are dodecanol, palmityl alcohol, stearyl alcohol, oleyl alcohol or tallow fatty alcohols, preferably hexanol, 2-ethylhexanol and decanol.

Suitable alkylphenols for (b) are butylphenol, hexylphenol, and, in particular, isooctylphenol, nonylphenol and dodecylphenol.

Suitable fatty amines for (c) are, in addition to stearylamine, e.g. palmitylamine and, in particular, oleylamine.

Examples of suitable saturated and/or unsaturated fatty acids for (d) are palmitic acid, in particular stearic acid and oleic acid.

The ethylene oxide adducts are known or they can be obtained by methods which are known per se (reference is made in this connection e.g. to N. Schönfeldt, Grenzflächenaktive Aethylenoxid-Addukte; Wissenschaftliche Verlagsgesellschaft GmbH, Stuttgart, 1976).

The metal complex dyes are e.g. 1:1 or 1:2 metal complexes of azo or azomethine dyes or metallised phthalocyanines such as copper phthalocyanine or nickel phthalocyanine. Preferred 1:1 and 1:2 metal complexes are 1:1 nickel complexes, 1:1 cobalt complexes, 1:1 copper complexes, 1:1 chromium complexes, 1:1 iron complexes or symmetrical or asymmetrical 1:2 cobalt complexes, 1:2 iron complexes or 1:2 chromium complexes, which complexes carry as chromophoric ligands e.g. o-carboxy-o'-hydroxyazo dyes, o-hydroxy-o'-aminoazo dyes or o,o'-dihydroxyazo dyes of the benzene-azobenzene, naphthalene-azonaphthalene, benzene-azonaphthalene, benzene-azopyrazolone, benzene-azopyridine or benzene-azoacetoacetamide type, which dyes may be unsubstituted or substituted. Examples of possible substituents are: carboxyl and sulfo groups, unsubstituted or substituted sulfamoyl or alkylsulfonyl, halogen atoms or the nitro or acetamido group.

The azo dyes may be monoazo, disazo or polyazo dyes. In asymmetrical 1:2 metal complex dyes, colourless ligands such as bidentate hydroxyquinoline derivatives are also suitable in addition to the azo dyes.

The formulations of this invention preferably contain 1:2 metal complex dyes of monoazo and/or disazo dyes, which complexes do not contain water-solubilising groups and in which the complexed metal ion is a chromium or cobalt ion. The formulations may contain a single dye or also a mixture of several metal complex dyes.

The anionic dispersants are the conventional dispersants for metal complex dyes, in particular condensation products of formaldeyde with aromatic sulfonic acids or 2-alkylbenzimidazole disulfonates, the alkyl moiety of which contains 10 to 25 carbon atoms, or also lignosulfonates. Examples of formaldehyde condensates are condensation products of formaldehyde and naphthalenesulfonic acids, or of formaldehyde, naphthalenesulfonic acid and benzenesulfonic acid, or a condensation product of crude cresol, formaldehyde and naphthalenesulfonic acid, as well as condensates of phenolsulfonic acid, cresolsulfonic acid or naphtholsulfonic acid and formaldehyde.

The formulations of the invention may contain as further ingredients e.g. extruders such as dextrin, urea or an inorganic salt such as sodium chloride or sodium sulfate, as well as a wetting agent such as nonylphenol diglycol ether sulfate or dodecylbenzenesulfonate, or also an antifoam and/or a binder.

Formulations having a particularly good cold water dispersibility are in the form of spray granulates of the following composition:
(a) 30–90% by weight of a metal complex dye, in particular 40–80% by weight of a 1:2 chromium complex dye which does not contain water-solubilising groups,
(b) 1–20% by weight of a non-ionic ethylene oxide adduct having a molecular weight of 200 to 1000, in particular 5–10% by weight of an ethoxylate of $C_4$–$C_{12}$alkylphenol with 8 to 15 moles of ethylene oxide per mole of alkylphenol,
(c) 5–50% by weight of a lignosulfonate, a 2-alkylbenzimidazole disulfonate or of a condensation product of formaldehyde and an aromatic sulfonic acid, in particular 10–25% by weight of a mixture of a 2-alkylbenzimidazole disulfonate and a condensation product of formaldehyde and naphthalenesulfonic acid, and optionally further ingredients.

If the metal complex dye is used as crude dye and has only limited solubility in water, then the suspension obtained by suspending the dye in water after addition of the anionic dispersant or mixture of dispersants and of the ethylene oxide adduct, is conveniently subjected to a grinding procedure until the primary particle size of the dye particles is $\leq 10$ μm, preferably 1 to 3 μm. It is also possible not to add the ethylene oxide adduct until after the wet grinding procedure. Spray drying is then effected after the grinding procedure.

For spray drying or jet spray drying, the dye solution or suspension is introduced into the spray tower by means of a pressure jet, a pneumatic jet or a rotating atomiser. The temperature at the air inlet of the spray tower is in the range from 180° to 300° C., and at the exit in the range from 110° to 150° C.

The dyes may be used e.g. as dry products or as filter cakes, or also in the form of the synthesis solution or suspension.

If the components are ground, some of them may also be added only after the grinding procedure. It is also possible to mix initially only some of the components and then to add the rest, e.g. the wetting agent, at the conclusion, e.g. after drying.

The interaction of the ethylene oxide adduct with the metal complex dye appears to be important for the improvement in solubility and for the increased dispersibility and wettability brought about by the adduct. The formation of addition complexes takes place (calorimetric measurements indicate a slightly exothermic heat of formation); an interaction between both dye and hydrophobic moiety of the ethylene oxide adduct and between its hydrophilic polyether chain and the dye molecule is able to take place (q.v. for example Y. Nemoto and H. Funahashi, Ind. Eng. Chem., Prod. Res. Dev. 19, (1980), 136–142).

Accordingly, it is also possible to react the metal complex dye first with the ethylene oxide adduct and subsequently to add an anionic dispersant to the resultant addition complex and then, if desired, to subject the mixture to a wet grinding procedure and to dry it in a spray drier.

The metal complex dye formulations, granulates or powders are readily wettable and have a cold water solubility or dispersibility of $\geq 30$ g/l. They can be used directly for the preparation of the dye baths, padding liquors or printing pastes. These are suitable for dyeing or printing in particular textile material, e.g. made of wool or synthetic polyamide.

The invention is illustrated by the following Examples, in which percentages are by weight. Viscosity measurements were carried out with a Contraves Rheomat 115, and calorimetric measurements with a LKB 8700-1 precision calorimeter.

EXAMPLE 1

1.5 kg of the crude dye of the formula

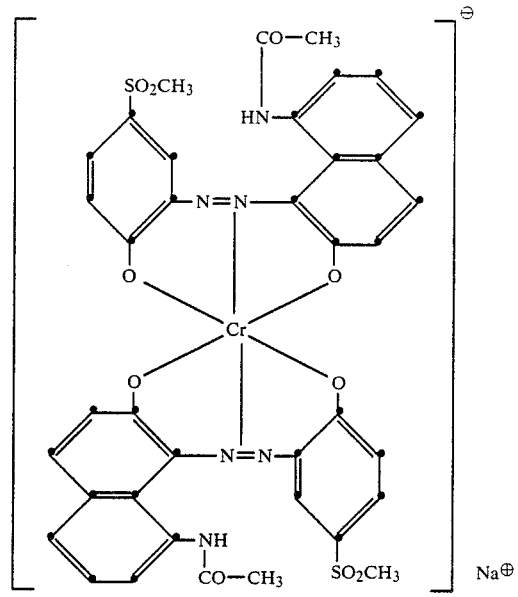

0.25 kg of a naphthalenesulfonic acid/formaldehyde condensate (as sodium salt), 0.1 kg of sodium 2-heptadecylbenzimidazole disulfonate and 0.15 kg of nonylphenol pentadecaglycol ether are suspended in about 1.5 liters of water. This mixture is stirred to a homogeneous paste having a solids content of about 30% and a pH value of about 10. The suspension is then subjected to a wet grinding procedure until a particle size of 1 to 3 μm is attained. The grinding time is 8 hours. The suspension so obtained can be filtered through a SS 1450 filter paper to leave almost no residue.

After the grinding procedure, the dye suspension is adjusted to the desired final dye concentration by addition of naphthalenesulfonic acid/formaldehyde condensate (sodium salt) and then spray granulated.

The spray granulation is carried out in a spray tower which is equipped with a mono-fluid nozzle. The air inlet temperature is about 210° C., and the air exit temperature is in the range from 110° to 150° C. The viscosity of the suspension is about 0.3 poise.

A solid dye formulation of the following composition is obtained:
71.3% of crude dye,
11.6% of naphthalenesulfonic acid/formaldehyde condensate (sodium (salt), 5.0% of sodium 2-heptadecylbenzimidazole disulfonate,
7.1% of nonylphenol pentadecaglycol ether,
5.0% of residual moisture.

The formulation has a cold water dispersibility of more than 30 g/l at 20° C., is readily wettable, and is suitable for dyeing and printing textile materials of wool or polyamide.

A formulation of the composition as indicated above, but without nonylphenol pentadecaglycol ether, has a cold water dispersibility of less than 1 g/l.

The calorimetrically determined heat of formation of the addition complex of 1:2 chromium complex dye and nonylphenol pentadecaglycol ether is about −10 kJ/mole.

EXAMPLE 2

64.6 g of the moist crude dye of the formula

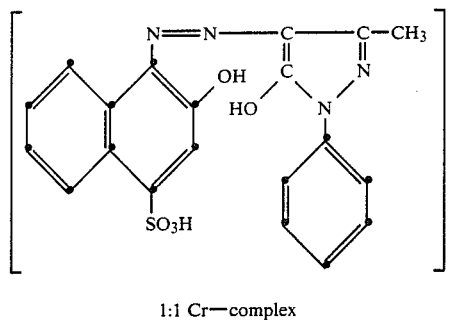

1:1 Cr—complex 32.3 g of naphthalenesulfonic acid/formaldehyde condensate (sodium salt), 7.9 g of nonylphenol pentadecaglycol ether and 4.8 g of sodium 2-heptadecylbenzimidazole disulfonate are suspended in 110 ml of water and the suspension is ground with 400 g of glass beads ($\phi$ 2 mm) for 4 hours. The particle size of the dye is $\geq 5$ $\mu$m. The dye suspension so obtained is of low viscosity (viscosity 24.5 mPas), has a pH of 6.2 and a density of 1.13. Spray drying gives a dye granulate of the following composition:
50.0% of crude dye
32.3% of naphthalenesulfonic acid/formaldehyde condensate (Na-salt),
7.9% of nonylphenol pentadecaglycol ether,
4.8% of sodium 2-heptadecylbenzimidazole disulfonate,
5.0% of residual moisture.

The formulation has a cold water dispersibility of 30 g/l.

EXAMPLE 3

The procedure of Example 2 is repeated, except that nonylphenol pentadecaglycol ether is replaced by the same amount of an adduct of oleic acid with 6 moles of ethylene oxide per mole of oleic acid. After the grinding procedure there is obtained also a low-viscosity suspension (viscosity 29.5 mPas; pH 6.0; density 1.14) which can be readily spray dried to give a formulation having a cold water dispersibility of 30 g/l.

The cold water dispersibility of the formulation is determined as follows (sprinkling in test):

Specific amounts of the dye formulation are each added to 200 ml of demineralised water of about 20° C. and stirred for 2 minutes (400 ml glass beaker; magnetic stirrer, 750 rpm). Each of the dye solutions is filtered through a paper filter (SS 1450 CV; diameter 7 cm) which is then washed with 50 ml of demineralised water. The cold water dispersibility is expressed as the maximum amount of dye in grams per liter which is completely dispersed, i.e. which gives a dispersion that can be filtered without leaving any residue.

I claim:

1. A non-effervescent solid formulation of a metal complex dye having a cold water solubility or dispersivity of at least 30 grams per liter, which formulation is obtained by spray drying an aqueous solution or dispersion of a metal complex dye, and which solution or dispersion consists essentially of water, the metal complex dye, an anionic dispersant and 1 to 20% by weight, based on the final formulation, of a non-ionic ethylene oxide adduct having a molecular weight of 200 to 5000.

2. A solid dye formulation of claim 1, wherein the ethylene oxide adduct is a reaction product of ethylene oxide with
    (a) a saturated and/or unsaturated fatty alcohol containing 6 to 20 carbon atoms, or
    (b) an alkylphenol containing 4 to 12 carbon atoms in the alkyl moiety, or
    (c) a saturated and/or unsaturated fatty amine containing 14 to 20 carbon atoms, or
    (d) a saturated and/or unsaturated fatty acid containing 14 to 20 carbon atoms.

3. A solid dye formulation of claim 2, wherein the ethylene oxide adduct is a reaction product of an alkylphenol containing 4 to 12 carbon atoms in the alkyl moiety with 8 to 15 moles of ethylene oxide per mole of alkylphenol.

4. A solid dye formulation of claim 1, wherein the dye is a 1:2 metal complex dye which does not contain water-solubilising groups and contains as ligand a monoazo and/or diazo dye and, as central metal ion, a chromium or cobalt ion.

5. A solid dye formulation of claim 1 which contains one or more of an extender, a wetting agent, an antifoam or a binder as further ingredients.

6. A solid dye formulation of claim 1, which consists essentially of
    (a) 30–90% by weight of a metal complex dye,
    (b) 1–20% by weight of a non-ionic ethylene oxide adduct having a molecular weight of 200 to 1000,
    (c) 5–50% by weight of a lignosulfonate, a 2-alkylbenzimidazole disulfonate and/or of a condensate of formaldehyde with an aromatic sulfonic acid.

7. A solid dye formulation of claim 6, which consists essentially of
    (a) 40–80% of a 1:2 chromium complex dye which does not contain water-solubilising groups,
    (b) 5–10% by weight of an adduct of a $C_4$–$C_{12}$alkylphenol with 8 to 15 moles of ethylene oxide per mole of alkylphenol, and
    (c) 10–25% by weight of a mixture of a 2-alkylbenzimidazole disulfonate and a naphthalenesulfonic acid/formaldehyde condensate.

8. A solid dye formulation of claim 1, which is prepared by subjecting the aqueous suspension of the components, before spray drying, to a grinding procedure until the primary particle size of the dye particles is <10 $\mu$m.

9. A method of preparing a bath for the dyeing or printing of wool or synthetic polyamide which consists of the step of dispersing a solid dye formulation of claims 1 or 5 in said bath.

* * * * *